July 18, 1944.  G. H. PHELPS  2,354,173
WELDING
Filed Aug. 8, 1941
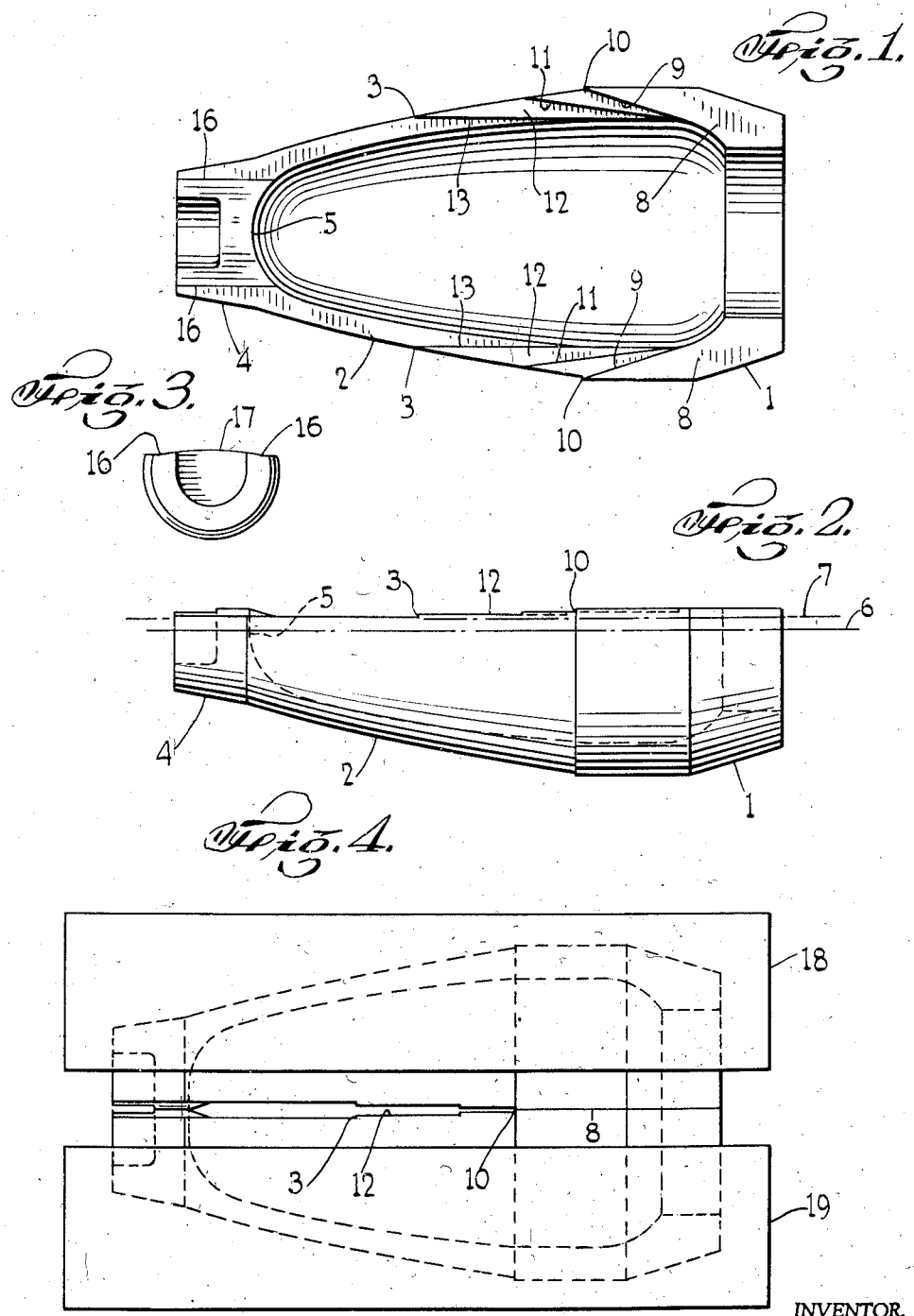
INVENTOR.
George H. Phelps
BY George T. Gill
ATTORNEY Patented July 18, 1944

2,354,173

UNITED STATES PATENT OFFICE 2,354,173

WELDING

George H. Phelps, Floral Park, N. Y.

Application August 8, 1941, Serial No. 405,963

2 Claims. (Cl. 219—10)

The invention herein disclosed relates to electric resistance welding, and more particularly to the welding of a piece of metal so formed that the weld area does not heat uniformly with the passage of the welding current.

The sections of pieces to be welded, at the weld area, are often such that there is a variation in the heating between portions of the edges to be welded. For example, the section of the pieces at the weld area may be irregular. In this case there are greater areas in contact at certain portions of the edges than at others. In consequence, there is a lesser resistance and slower heating at such portions than at those portions having less area in contact. Again the edge or section of the pieces at the joint may be such that part thereof is somewhat removed from the electrode. Such part is not subjected to as high a current density as other parts or portions and in consequence has a slower heating rate. Uneven heating in the weld in this manner and for other similar causes is not conducive to the production of uniform welds of high quality.

By the invention herein disclosed, uniform heating in electric resistance welding may be obtained in irregular and non-uniform sections. In accordance with the invention the contacting edges of the pieces to be joined are formed to effect an irregular contact of the edges to be joined in accordance with the rate of heating of the various portions in the weld area. This may be accomplished, for example, in the making of an article by electric resistance welding of two pieces together, by forming the pieces and thereafter swedging the edges of the pieces to vary separate portions from what may be termed the plane of the edge. When the two pieces are then brought together in the welding operation, the contact between the edges to be joined is irregular and intermittent. The swedging is of course controlled to effect a contact between the edges in accordance with the normal rate of heating of the separate portions in the weld area. In this way contact is first made only at those points having the slowest rate of heating. As the heating continues the various portions come into contact, the portion having the highest rate of heating coming into contact last. By properly separating the various portions of the edges, in this way, it is possible to achieve very uniform heating throughout the weld area and effect a uniform weld.

The invention while not limited to any particular article will be more clearly understood from the following description thereof as applied to the making of a mortar shell such as that illustrated in the accompanying drawing in which:

Fig. 1 is a plan of a longitudinally divided semi-shell sector;

Fig. 2 is a side elevation thereof;

Fig. 3 is an end elevation thereof; and

Fig. 4 is a side elevation of two shell sectors in the welding dies or electrodes of an electric resistance welder.

In the making of parts that are to be joined together by electric resistance welding, it is necessary to allow for the take-up as the weld is effected as the metal at the edges of the pieces is forced into each other and metal is extruded at the joint. The longitudinally divided semi-shell sector disclosed in Figs. 1 to 3 of the drawing is thus formed. This shell sector is stamped from rolled plate having a cross-section comparable to an edge section of the shell sector. Two longitudinally divided semi-shell sectors are placed in electrodes having recesses similar to dies in which the shell sectors are received. The sectors are then brought together in edge to edge relation under heavy pressure and a heavy current is caused to flow between the sectors. In this way the sectors in the weld area are brought to welding temperature and the metal at the edges is forced together and the weld effected.

The shell sector illustrated includes a nose or forward end portion 1 of a certain wall thickness and a tapering intermediate portion 2 at the rear of the forward end portion. This tapering portion has a wall section that gradually decreases in thickness to a transverse plane indicated by the line 3, and from this plane rearwardly it is of substantially uniform thickness. At the end of the tapering portion 2, there is a short, substantially cylindrical portion 4 which is separated from the tapering portion by a transverse barrier 5.

The plane of the axis of the shell sector is indicated in Fig. 2 by the center line 6. A like line 7 indicates a plane parallel to the axis of the shell sector but spaced therefrom by one-half of the welding take-up. In the following description this plane 7 is taken as a reference plane and referred to for the purpose of description as the "basic height." Certain parts of the edges of the shell sector, as hereinafter explained, extend beyond or above the basic height in accordance with their normal rate of heating.

In the stamping and drawing of the shell sector, the edges thereof may at all points extend beyond or above the basic height by the amount that those portions having the slowest normal rate of heating extend beyond the basic height. After the shell sector is drawn, it is swedged in swedging dies to vary the relation of separate portions or areas with respect to the basic height and in accordance with the normal rate of heating of such portions. The term "in accordance with" is not intended to imply a proportional relation as the relation may be empirical and arbitrary but rather indicates a relation in respect to the normal rate of heating of portions of an irregular section such as to produce a uniform heating in the area of the weld.

By the swedging operation on the shell sector illustrated, the edge portions 8 (Fig. 1) of the forward end, terminating at lines 9, are allowed to extend beyond the basic height by fifteen thousandths of an inch. The portions 10 between the lines 9 and lines 11 extend beyond the basic height by seven thousandths of an inch. The portions 12 between the lines 11 and lines 13 extend four thousandths of an inch above the basic height and the remainder of the edges of the tapering portion 2 to the rear of the lines 13, and outer edge of the cylindrical portion 4 are at the basic height.

The barrier which does not come into direct contact with the electrodes has a differential rate of heating. As will be seen from Fig. 4, the electrodes 18 and 19 are recessed in the nature of dies and each receives a shell sector. The engagement of the electrodes with the shell sector is between the surface of the electrode and the outer surface of the shell sector. Because of this, the center of the barrier, that is the portion along the axis has a slower normal rate of heating than the edges and the rate of heating progressively increases towards the edges. To the end of modifying the contact of the barrier in accordance with this differential rate of heating, and the portion of the edge of the cylindrical extension indicated as radially inwardly of the lines 16, this portion of the contact area is made to conform to an arc of a circle indicated by the extension line 17 (Fig. 3), and in this instance of a radius of three inches. The center point or axial center line of the barrier extends above the basic height by fifteen thousandths of an inch and tapers to the basic height at the edges.

Two such sectors, swedged in this manner, are placed in electrodes 18 and 19 of an electric resistance welder and the edges brought together as illustrated in Fig. 4. As both semi-shell sectors have been swedged in the same manner, each has an edge variation of one-half of that required to secure a uniform heat throughout the weld area, in other words, the relation of the various edge portions given above with respect to the semi-shell sector described is one-half of the separation required to secure uniform heating.

When the semi-shell sectors are thus first brought together only the portions 8 and the centers of the semi-barriers 5 come into contact. As the welding current flows, these portions become heated and softened, and under the pressure exerted the several portions come into contact successively in accordance with their distance from or extension beyond the basic height. A uniform heating throughout the weld area is thus attained and a uniform weld effected between the semi-shell sectors.

The invention has been described as it is applied in the production of shells, the parts of which are stamped and drawn from plate. It is however equally applicable to the welding of any two pieces in which the section in the weld area is such that, normally, uniform heating would not be obtained, and it will be obvious that various changes may be made by those skilled in the art in the details of the application of the invention described above within the principle and scope of the invention as expressed in the appended claims.

I claim:

1. In the method of electric resistance welding two pieces of metal having edge portions of different thickness and of different distances from a surface and wherein the pieces are pressed together in edge to edge contact, electrical contact is made with surfaces of the pieces and an electric current is caused to flow through the contacting edges, the step which consists in shaping the contacting edges of the pieces to effect a progressive separation of the edges inversely as the thickness of the edge portions and the distance from the surface with which electrical contact is made.

2. In the method of electric resistance welding two pieces of metal having edge portions of different thickness and of different distances from a surface and wherein the pieces are pressed together in edge to edge contact, electrical contact is made with surfaces of the pieces and an electric current is caused to flow through the contacting edges, the step which consists in shaping by swedging the contacting edges of the pieces to effect a progressive separation of the edges inversely as the thickness of the edge portions and the distances from the surface with which electrical contact is made.

GEORGE H. PHELPS.